2,962,516
PROCESS FOR THE MANUFACTURE OF PHOSPHORYLATED HYDROXY-ACIDS AND DERIVATIVES THEREOF

Emile Cherbuliez, Conches, and Joseph Rabinowitz, Geneva, Switzerland, assignors to Ciba Pharmaceutical Products Inc., Summit, N.J.

No Drawing. Filed May 8, 1957, Ser. No. 657,719

Claims priority, application Switzerland May 10, 1956

2 Claims. (Cl. 260—461)

The present invention relates to a new process for the manufacture of phosphorylated aliphatic or aromatic hydroxycarboxylic acids or acid derivatives thereof.

The phosphorylation of the hydroxyl groups of organic hydroxycarboxylic acids to form derivatives of the type, $H_2O_3P$—O—R—COOH, in which R is an organic radical, has been frequently studied, principally because of the known utility, due to the valuable biochemical properties, of compounds of that type, for example, phospho-lactic acid and phospho-enol-pyruvic acid [cf. for example A. Closse, "Chemiker-Zeitung," 81, 72 (1957)]. None of the methods proposed, especially the treatment of the hydroxy-carboxylic acids with phosphorus oxychloride in the presence of a tertiary base, gave the desired result, except in a very moderate yield, often of only 5 to 10 percent, and then only with numerous intermediate operations.

Phosphorylation by means of polyphosphoric acids or pyrophosphoric acid, which is quite satisfactory for preparing phosphoryl-derivatives of simple alcohols and amino-alcohols, leads to very poor yields in the case of alcohols which contain a free carboxyl group, for example, alcohol carboxylic acids and phenol carboxylic acids.

The surprising discovery has now been made that considerably greater yields of phosphorylated hydroxycarboxylic acids or acid derivatives thereof are obtained in a simple manner when, instead of the free hydrocarboxylic acids, esters, amides or nitriles of aliphatic or aromatic hydroxycarboxylic acids are reacted with polyphosphoric acids or hyrophosphoric acid and, if desired, the modified carboxyl groups in the resulting phosphorylated compounds are converted into the free carbonyl group.

The phosphorylation of the aforesaid derivatives of the acids by means of polyphosphoric acids or pyrophosphoric acid leads to yields similar to those obtained with simple alcohols.

Conversion, if any, of the ester, amide or nitrile groups into the free carboxyl group, can be accomplished in per se conventional manner, e.g. by the selective hydrolysis of these groups or by treating the amides with nitrous acid.

By this process it is also possible to phosphorylate esters, amides or nitriles of aliphatic or aromatic ketocarboxylic acids, such as methyl pyruvate or pyruvic acid nitrile, because under the conditions of the process they react in the enol form and thus yield the corresponding phospho-enol derivatives.

Carrying out the phosphorylation by the process of this invention has two additional practical advantages. Firstly, the procedure is simple; advantageously the starting material to be phosphorylated is heated at a suitable temperature with a slight excess of the polyphosphoric acid or pyrophosphoric acid. Secondly, the phosphorylation product can be separated in a simple manner in one operation. According to a preferred embodiment of the invention the cooled reaction product is taken up in cold water, and the solution is brought to a pH value of approximately 8.5 (the point of neutrality for phenolphthalein) by means of an alkaline earth metal hydroxide; the excess of the polyphosphoric acid or pyrophosphoric acid and also the orthophosphoric acid formed during the phosphorylation are precipitated in a completely insoluble form as their salts with an alkaline earth metal; the resulting liquor, after removing the precipitate therefrom, is concentrated preferably at a low temperature and/or precipitated by the addition of alcohol, whereby the phosphorylation product is obtained in the form of its alkaline earth metal salt free from inorganic phosphorus compounds, and from which salt the free acid can be obtained by precipitation of the alkaline earth cations by means of a suitable acid, for example, sulfuric acid in the case of barium, or from which the corresponding alkali metal salt can be obtained by double decomposition with an alkali metal carbonate.

The following examples illustrate the invention:

Example 1

9 grams of ethyl lactate and 40 grams of polyphosphoric acid (index of condensation equals 2.7) are heated for 4 hours at 100° C. The mixture is taken up in cold water, and the solution is neutralized by means of barium hydroxide to the neutral point of phenolphthalein. The copious precipitate of barium phosphate and barium polyphosphate is filtered off and washed with cold water. The limpid solution is concentrated under reduced pressure to about 100 cc. and 400 cc. of alcohol are added. There are obtained 7.7 grams of barium 1-carbethoxy-ethyl phosphate $CH_3$—$CH(COOC_2H_5)$—$OPO_3Ba,H_2O$. The yield is 27 percent.

The latter salt is dissolved in water in the presence of an equivalent quantity of sulfuric acid. The precipitated barium sulfate is removed, and the solution is rendered normal with sodiumhydroxide, the mixture is heated for 1½ hours under reflux, and then an equivalent quantity (1½ mol per mol of the above-mentioned barium salt) of barium chloride is added. The precipitated sesquibarium salt of pholactic acid,

$$CH_3—CH(COOBa_{1/2})—OPO_3Ba$$

is filtered off. The filtrate is concentrated to about 40 cc. and filtered hot to yield a second fraction of the sesquebarium salt. The yield in the selective hydrolysis of the —$COOC_2H_5$ group is 90 percent.

Example 2

4.7 grams of methyl pyruvate and 30 grams of pyrophosphoric acid are heated for 4 hours at 100° C. By working up the reaction product as described in the first paragraph of Example 1 there are obtained 4.8 grams of barium 1-carbomethoxy-ethenyl phosphate

$$CH_2=C(COOCH)—OPO_3Ba.H_2O$$

The yield is 35%.

1.68 grams of the latter salt are treated with 5 cc. of 2 N-sulfuric acid. The precipitated barium sulfate is removed from the solution, and the latter is rendered 2-normal with sodium hydroxide and treated for 1½ hours under reflux. There are then added 2.2 grams of barium hydroxide, the volume of the solution is made up to 100 cc. by the addition of water, the precipitate formed is filtered off and taken up with 100 cc. of water which dissolves the greater part of the precipitate. The combined filtrates are concentrated under reduced pressure to 100 cc., and 400 cc. of alcohol are added to precipitate 1.2 grams (yield 56%) of the sesqui-barium salt of phospho-enol-pyruvic acid.

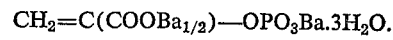
$$CH_2=C(COOBa_{1/2})—OPO_3Ba.3H_2O.$$

Example 3

10 grams of β-hydroxy-propionitrile and 40 grams of polyphosphoric acid (index of condensation equals 2.7)

are heated for 4 hours at 100° C. by working up in the manner described in the first paragraph of Example 1, there are obtained 12.0 grams of barium cyano-ethyl phosphate, $NC-CH_2-CH_2-OPO_3Ba.3H_2O$. The yield is 25%.

16.5 grams of the barium cyanoethyl phosphate so obtained are heated with 100 cc. of 2 N-sulfuric acid for 1½ hours under reflux. After being cooled, the mixture is rendered neutral to phenolphthalein with barium hydroxide and the precipitate formed is removed by centrifuging. The filtrate, amounting to about 1.5 liters, is concentrated under reduced pressure to the point at which precipitation sets in, and then 4 vol. of alcohol are added. There are obtained 12.7 grams of the sesquibarium salt of phospho-β-hydroxypropionic acid, $$BaO_3P-O-CH_2-CH_2-COOBa_{1/2}$$

The yield is 70%.

Example 4

10 grams of salicylic acid amide and 30 grams of pyrophosphoric acid are heated for 6 hours at 105° C. After being cooled, the mass is taken up with water and filtered. In this manner 7.2 grams of salicylic acid amide are recovered. The filtrate is worked up as described in the first paragraph of Example 1 to yield 2.0 grams of barium orthocarbamyl-phenyl phosphate, $$H_2NOC-C_6H_4-OPO_3Ba.H_2O$$

The yield is 27%.

The barium of the latter salt is eliminated by treating the salt with an equivalent quantity of sulfuric acid. The solution of ortho-carbamyl-phenyl-phosphoric acid so obtained is treated with an equivalent of nitrous acid in known manner. The ortho-carboxy-phenyl-phosphoric acid is precipitated in the form of its barium salt.

What is claimed is:

1. A process for the manufacture of phosphorylated hydroxycarboxylic acids comprising reacting a member of the group consisting of carbo loweralkoxy esters, unsubstituted amides and nitriles of lower aliphatic and aromatic hydroxycarboxylic acids with a member of the group consisting of polyphosphoric acids and pyrophosphoric acid, and converting the modified carboxyl group of the resultant phosphorylated compound into the free carboxyl group.

2. A process for the manufacture of phosphorylated hydroxycarboxylic acid derivatives comprising reacting a member of the group consisting of carbo loweralkoxy esters, unsubstituted amides and nitriles of lower aliphatic and aromatic hydroxycarboxylic acids with a member of the group consisting of polyphosphoric acids and pyrophosphoric acid.

References Cited in the file of this patent

UNITED STATES PATENTS

| | | |
|---|---|---|
| 2,176,080 | Katzman | Oct. 17, 1939 |
| 2,278,171 | De Groote et al. | Mar. 31, 1942 |
| 2,318,035 | Wayne | May 4, 1943 |
| 2,354,774 | Rummelsburg | Aug. 1, 1944 |
| 2,600,058 | Knowles et al. | June 10, 1952 |

FOREIGN PATENTS

| | | |
|---|---|---|
| 308,567 | Switzerland | Oct. 1, 1955 |

UNITED STATES PATENT OFFICE
CERTIFICATION OF CORRECTION

Patent No. 2,962,516　　　　　　　　　　　November 29, 1960

Emile Cherbuliez et al.

It is hereby certified that error appears in the above numbered patent requiring correction and that the said Letters Patent should read as corrected below.

Column 1, line 41, for "hydrocarboxylic" read -- hydroxycarboxylic --; line 46, for "carbonyl" read -- carboxyl --; column 2, line 53, for that portion of the formula reading "COOCH" read -- COOCH$_3$ --; line 58, for "treated" read -- heated --.

Signed and sealed this 25th day of July 1961.

(SEAL)
Attest:

ERNEST W. SWIDER
Attesting Officer

DAVID L. LADD
Commissioner of Patents